Aug. 13, 1963 H. L. PETERSON 3,100,875

TIME BASE A.M. DECTECTOR

Filed April 27, 1960

INVENTOR
HERBERT L. PETERSON

BY

ATTORNEY

United States Patent Office 3,100,875

Patented Aug. 13, 1963

3,100,875
TIME BASE A.M. DETECTOR

Herbert L. Peterson, 5521 24th Ave., Hillcrest Heights, Md.

Filed Apr. 27, 1960, Ser. No. 25,182
3 Claims. (Cl. 329—145)
(Granted under Title 35, U.S. Code (1952), sec. 266)

The invention described herein may be manufactured and used by or for the Government of the United States of America for governmental purposes without the payment of any royalties thereon or therefor.

This invention relates to a detector for amplitude modulated waves. More particularly it involves a detector for use in telemetry systems where the envelope data to be detected is sampled accurately during precisely determined time periods.

Simple detectors for amplitude modulated carriers, employing for example a rectifier and a passive R-C integrating network, are well known in the radio and television art. The information with which these circuits operate, however, is either slowly varying or repetitious and the final result must merely satisfy the ears or eyes of a human subject. The eyes and ears are only capable of perceiving rather course variations compared to those involved in telemetry. Aural preception for example, follows logarithmic changes in amplitude, and visual perception is incapable of detecting changes which occur more rapidly than 0.1 second.

In telemetry, on the other hand, the envelope data often contains abrupt changes from one peak to the next of the carrier which, if not detected at once, may never be recorded. To accurately record the magnitude of the peak and its time position relative to some predetermined reference point requires a very special type of detector.

An object of the present invention is, therefore, to provide an accurate peak reading detector for amplitude modulated waves.

A further object of the invention is to provide an accurate detector for amplitude modulated carrier waves which samples the peak values of the carrier over precisely referenced time intervals.

Other objects and many of the attendant advantages of this invention will be readily appreciated as the same becomes better understood by reference to the following detailed description when considered in connection with the accompanying drawings wherein.

Figure 1:
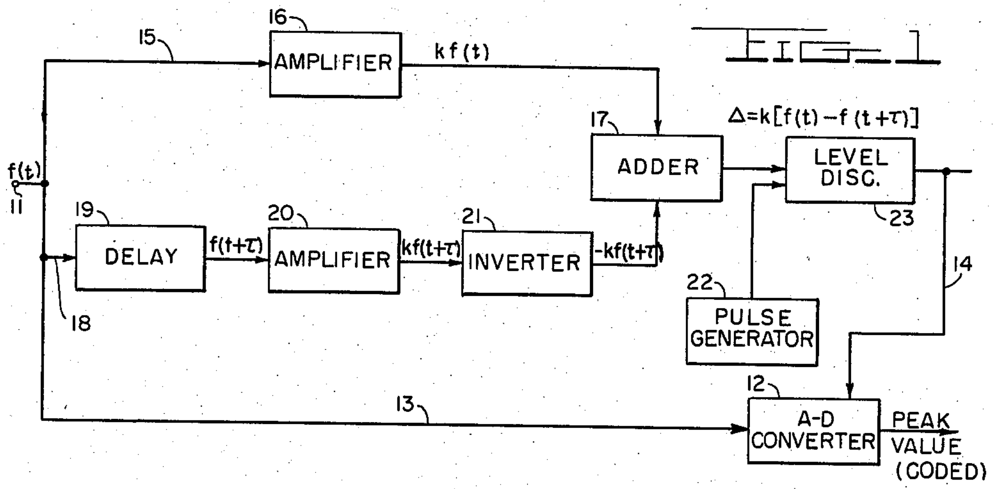
FIG. 1 shows a block diagram of the detector of the invention.

Referring to FIG. 1, the amplitude modulated carrier arriving from a source (not shown) is inserted at the input 11 of the detector circuit. This signal then travels to the analog input of an anlog-to-digital code converter 12 over a first signal path 13. The converter is normally inoperative, functioning only when a signal is applied through a trigger signal path 14.

To obtain a trigger signal at the same moment that a peak of the modulated carrier reaches the converter 12, the carrier is also passed through a direct path 15 to an adder 17. The direct path may contain an amplifier 16, if necessary, to prevent loading of the converter.

The output signal from the adder is a combination of the signal from the direct path and a similar signal passing through a delay path 18. The delay path includes a section 19 which has lower phase propagation velocity than that of the direct path. This path also may contain an amplifier 20 to prevent loading of the input of the detector. An inverter 21 must also be provided, for reasons which will become apparent, if this function is not present in the amplifier or no amplifier is used.

The structure of the analog-to-digital code converter 12 may be chosen from a number of such devices well known in the art. Examples of such a device are disclosed by George G. Bower in an article entitled "Analog to Digital Converters" published in Control Engineering, vol. 4, No. 4, published in April 1957, pp. 107–118, and Sherman Rigby in an article entitled, "Analog-to-Digital Converter," published in Electronics, vol. 29, No. 1, January 1956, pp. 152–155. In each of these converters the signal is sampled and stored for comparison in response to either an internal or externally applied sampling pulse, as supplied through path 14 in FIG. 1.

The elements for the direct and delay paths 15 and 18 in the triggering circuit are also well known in the art. The delay section 19 may be, for example, a lumped or distributed parameter transmission line. The amplifiers 16 and 20 must have equal amplification factors and constant phase characteristics. The adder 17 preferably employs an operational amplifier of conventional construction, although passive networks can be used.

The remaining elements of the circuit are used extensively in the computer art. The generator 22 is preferably a synchronized pulse forming circuit such as a one-shot multivibrator or a blocking oscillator. The level discriminator 23 which gates out a single generator pulse when the adder level changes is discussed at length by Millman and Taub in their text Pulse and Digital Circuits, chapter 15, published in 1956 by McGraw-Hill.

Figure 2:
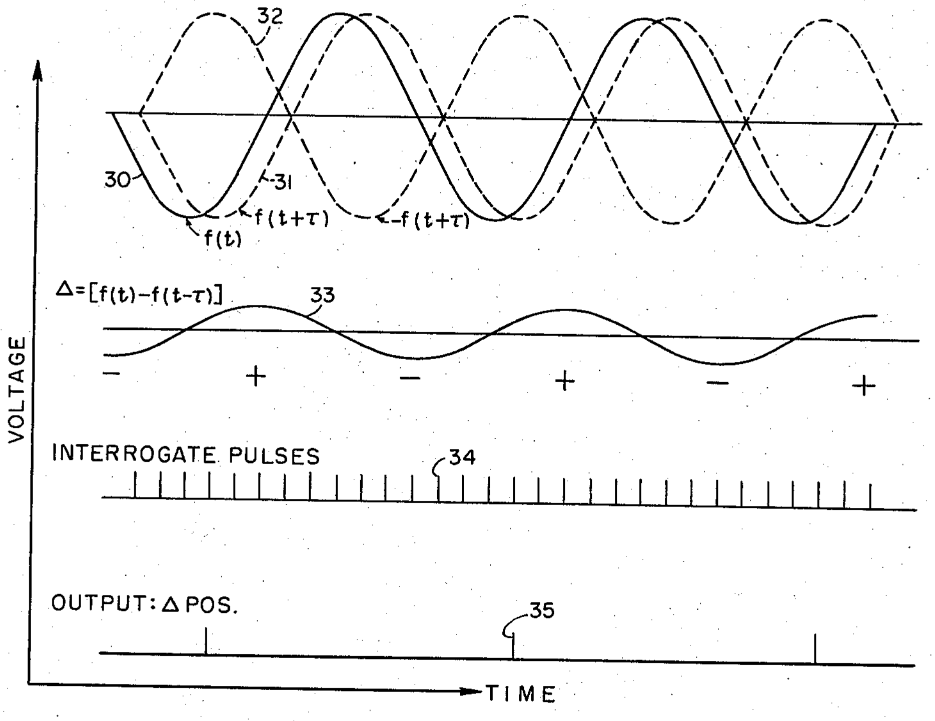
FIG. 2 is a graphical representation in time of the signals in different portions of the detector.

The operation of the circuit is best understood with reference to FIG. 2. This figure shows the voltages versus time in various parts of the circuit. Curve 30 represents the carrier as a function of time $f(t)$ as it appears at the converter input and the direct path 15 of FIG. 1. The dashed curve 31 represents the delayed carrier as a function of time $f(t+\tau)$, $\tau$ being a fixed delay time, as it appears at the output of the delay section 19. Curve 32 represents the output inverter 21 which can be described as a function of time $-f(t+\tau)$. The combination of the signals represented by curves 30 and 32 by the adder produces a new signal $\Delta$ described by the formula $\Delta=[f(t)-f(t+\tau)]$ and represented by the curve 33. Since the delay section is very short, i.e., a few electrical degrees the adder output level as depicted by curve 33 changes sign close to the peak value of the carrier input, curve 30.

The portion of output signal 33 having the same polarity as the pulses from generator 22 arrives at the level discriminator 23 in FIG. 1 and overlaps some interrogation pulses from that generator, these pulses being depicted in curve 34. The combined effect of these two signals is sufficient to trigger the level discriminator and produce a peak sampling pulse, as shown in curve 35.

The choice of elements for the various parts of the detector circuit depends to a large extent on the speed of the analog-to-digital converter 12. For example, if the converter is slow, the level discriminator may be a bistable circuit driven unsymmetrically, so that it changes state only with level changes, to cause sampling at one or both of the peaks. If the converter is fast the level discriminator may be a gate which opens to pass all of the interrogating clock pulses which occur during a half cycle of the adder output.

By sampling only at the time a clock pulse appears, the discrete amplitudes are not only referenced relative to one another, but may also be referenced to an earlier time after which these pulses are each duly recorded. Thus any information which may be present in the phase or frequency of the carrier is not lost in this detection process.

It is not likely in this detection system that the sample will be taken precisely at the peak. The error in peak reading, if such is critical, depends on the frequency of the interrogation pulses and the length of delay in section 19. The delay period of section 19 prevents the possibility of sampling until half this same period after the peak. The sample may be further delayed by a maximum of the full period between two interrogation pulses. Sufficient accuracy can generally be obtained by minimizing both of these periods. Some compensation may be obtained by delaying the carrier in path 13 so that the uncertain period, after the cross-over point of curve 33, during which the first effective interrogation pulse may occur is centered about the peak of the carrier.

In general the detector is best utilized as a part of a computer system wherein both the interrogation or clock pulses from generator 22 and the output of the converter are stored for future programming.

Obviously many modifications and variations of the present invention are possible in the light of the above teachings. It is therefore to be understood that within the scope of the appended claims the invention may be practiced otherwise than as specifically described.

What is claimed is:

1. An envelope detector for amplitude modulated carrier waves comprising an analog-to-digital converter with an analog input for said carrier waves and an external sampling signal input, a direct path and a delay path each having an input connected to said analog input, said delay path including means to delay and invert signals passing therethrough, adder means to combine the output signals from said direct and said delay paths, a source of clock pulses, a level discriminating means connected to said adder means and said source of clock pulses for emitting a sampling pulse in response to at least the first clock pulse following a sign change in the combined signal from said adder means the output of said level discriminating means being connected to said external sampling signal input.

2. An envelope detector for an amplitude modulated wave comprising, an analog-to-digital code converter having a first input for an analog signal and second input for an external sampling signal, a first and second signal path each having an input connected to said first input of said converter, the delay in one of said paths being slightly greater than the other, a signal inverter interposed in one of said paths, adder means for combining the output signals from said paths, a source of clock pulses, a level discriminator having a separate input connected to said source of clock pulses and the output of said adder, for passing a clock pulse when the output level of said adder changes sign, the output of said level discriminating means being connected to said second input of said converter.

3. An envelope detector according to claim 2 wherein said first and second paths contain signal amplifiers.

References Cited in the file of this patent

UNITED STATES PATENTS

| | | |
|---|---|---|
| 2,764,679 | Berkowitz | Sept. 25, 1956 |
| 2,840,707 | Johnson | June 24, 1958 |
| 2,955,203 | Finney et al. | Oct. 4, 1960 |